US 6,717,817 B2

(12) United States Patent  
Liu et al.

(10) Patent No.: US 6,717,817 B2
(45) Date of Patent: Apr. 6, 2004

(54) TRAY-STYLE FLASH MEMORY DRIVE

(76) Inventors: Wen-Tsung Liu, Fl. 4.5, No. 1.3, Lane 45, Pao-Shing Rd., Hsin-Dian City, Taipei County (TW); Chin-Pin Yang, Fl. 4.5, No. 1.3, Lane 45, Pao-Shing Rd., Hsin-Dian City, Taipei County (TW)

( * ) Notice: Subject to any disclaimer, the term of this patent is extended or adjusted under 35 U.S.C. 154(b) by 0 days.

(21) Appl. No.: 10/316,034

(22) Filed: Dec. 11, 2002

(65) Prior Publication Data

US 2004/0047134 A1 Mar. 11, 2004

(30) Foreign Application Priority Data

Sep. 9, 2002 (TW) ........................... 91214157 U

(51) Int. Cl.[7] .............................. H05K 7/14; G06K 7/04
(52) U.S. Cl. ...................... 361/737; 361/756; 361/741; 235/486
(58) Field of Search ................................ 361/737, 736, 361/740, 747, 756; 235/492, 486

(56) References Cited

U.S. PATENT DOCUMENTS 6,101,372 A * 8/2000 Kubo ........................ 455/90
6,102,715 A * 8/2000 Centofante ................. 439/140
6,241,545 B1 * 6/2001 Bricaud et al. ............. 439/326
6,264,483 B1 * 7/2001 Wilson ....................... 439/137
6,293,464 B1 * 9/2001 Smalley, Jr. ................ 235/451
6,413,108 B2 * 7/2002 Centofante ................. 439/267
6,468,101 B2 * 10/2002 Suzuki ....................... 439/326
6,471,550 B2 * 10/2002 Maiterth et al. ............. 439/631
6,580,923 B1 * 6/2003 Kubo ......................... 455/558
6,641,413 B2 * 11/2003 Kuroda ...................... 439/159

* cited by examiner

Primary Examiner—David Martin
Assistant Examiner—Dameon E. Levi

(57) ABSTRACT

The present invention provides a tray-style flash memory drive that can be embedded in or externally connected to a computer system or a digital electronic product to enable the computer system or digital product to access various memory cards (flash memory cards). The flash memory drive includes a case, a base in the case, and a tray that can on the base. A circuit board is provided in the case, and the circuit board has a signal transmission unit and a plurality of contacts. A plurality of terminals is provided at the bottom of the tray. When the tray slides out of the base, and a memory card is placed in it, the terminals contact the I/O pins of the memory card. When the tray slides backward into the base, the terminals contact the contacts on the circuit board electrically. Thus, data stored in the memory card can be transmitted via the transmission unit.

7 Claims, 9 Drawing Sheets

TRAY-STYLE FLASH MEMORY DRIVE

BACKGROUND OF THE INVENTION

1. Field of the Invention

The present invention relates to a tray-style flash memory drive that can be used to access memory cards to enable the memory cards to serve as storage media for computer systems or portable digital products.

2. Description of Related Art

A flash memory drive is a device that is used to access memory cards (also referred as flash memory cards). As shown in FIG. 1, a conventional flash memory drive (1) typically is a box-shape device that can be embedded in or externally connected to a computer system or a portable digital product such as PDA, DSC, or MP3 Player through its signal transmission unit (2). There is an opening on the leading edge of the flash memory drive to enable a memory card (3) to be inserted in the flash memory drive. When a memory card (3) is inserted in said flash memory drive (1) through the opening, it will be connected to the computer system or portable digital product via the signal transmission unit (2) of the flash memory drive (1), and the computer or digital product can access the memory card (3) with the help of the flash memory drive (1).

Said memory card (3) may be (but not limited to) a Compact Flash Card (Type I/II), Smart Media Card, Multimedia Card, Secure Digital Card, xD Card or Memory Stick Card, which has a plurality of I/O pins at different positions. As the card is inserted in the flash memory drive (1), the I/O pins frictionally touch the fixed conductive terminals or contacts of the flash memory card (1). When the memory card (3) is located in place in the flash memory drive (1), the I/O pins contact firmly the fixed conductive terminals or contacts of the flash memory card (1).

In other words, insertion and pullout actions of the memory card (3) generate constant friction between the I/O pins of the memory card (3) and the fixed conductive terminals or contacts of the flash memory drive (1). As time passes, the I/O pins of the memory card (3) are worn out easily and it results in the memory card (3) being useless and important data is incapable of being accessed.

As the memory card (3) is getting more and more popular, above disadvantage of conventional flash memory drives has become a severe problem. Therefore, the inventor provides a tray-style flash memory drive, which can eliminate above disadvantage residing in conventional flash memory drives.

SUMMARY OF THE INVENTION

A tray-style flash memory drive according to the present invention comprises a case, a base in the case, and a tray that can slide into or out of the base. A circuit board is provided in the case, and the circuit board has a signal transmission unit and a plurality of contacts. A plurality of terminals is provided at the bottom of the tray. When the tray slides away the base and a memory card is placed in it, the terminals contacts the I/O pins of the memory card. When the tray slides into the base, the terminals contact the contacts on the circuit board electrically. Thus, data stored in the memory card can be transmitted via the transmission unit.

An object of the present invention is to provide a tray-style flash memory drive, in which the memory card is placed for the I/O pins of the memory card being able to couple with the circuit board via terminals on the tray instead of touching fixed contacts in the flash memory drive directly such that the I/O pins of the memory card can be free from being worn out to prolong lifecycle of the memory card.

Another object of the present invention is to provide a tray-style flash memory drive, with which the direction of the memory card being laid is not restricted, such that the tray can accommodate memory cards in different sizes or specifications for data in different types of memory cards being transmitted each other indirectly.

A further object of the present invention is to provide a tray-style flash memory drive in which a locking part on the leading edge of the tray can be operated to press and locate the memory card automatically and can be loosened for the memory card being taken out easily.

The detailed structure, principle, and efficacy of the present invention will be described in further detail in company with the following drawings.

DETAILED DESCRIPTION OF THE EMBODIMENTS

Figure 1:
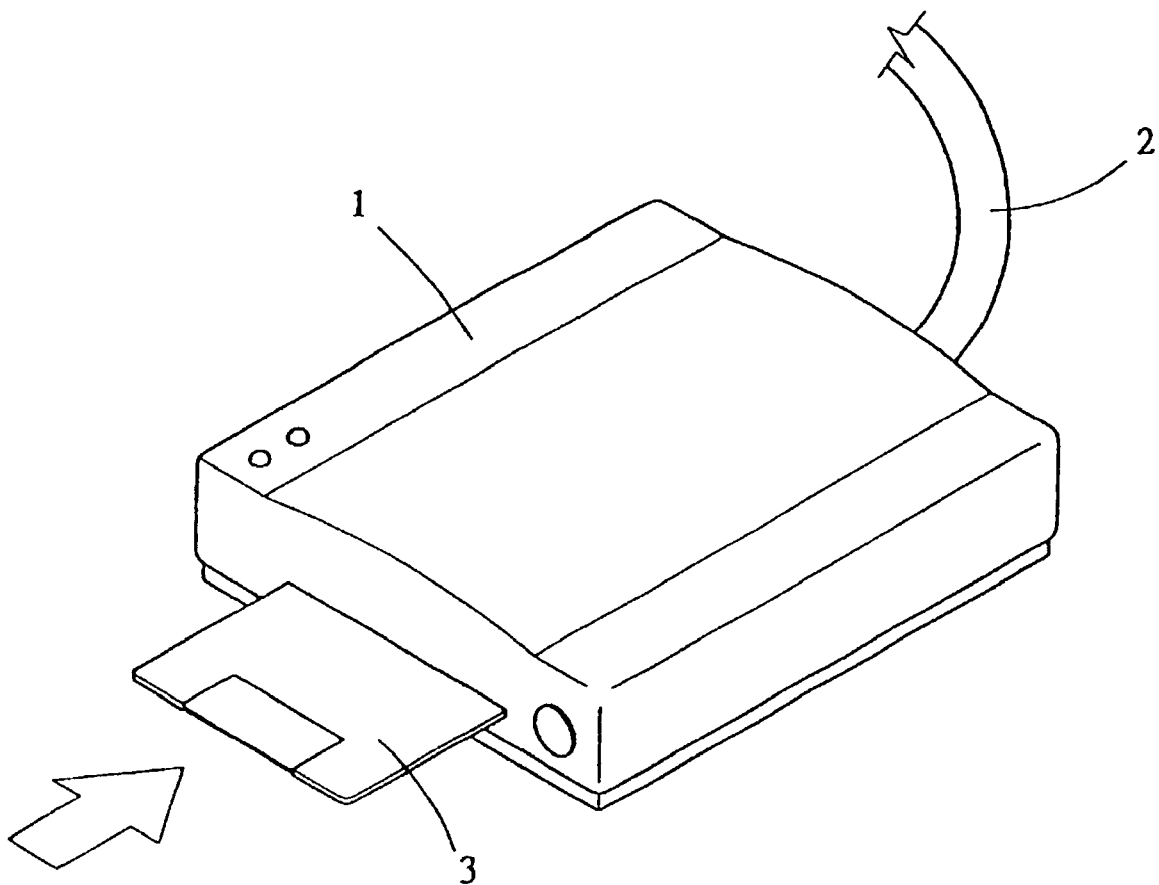
FIG. 1 is a perspective view of a conventional flash memory drive with a memory card being inserted in the dive.
Figure 2:
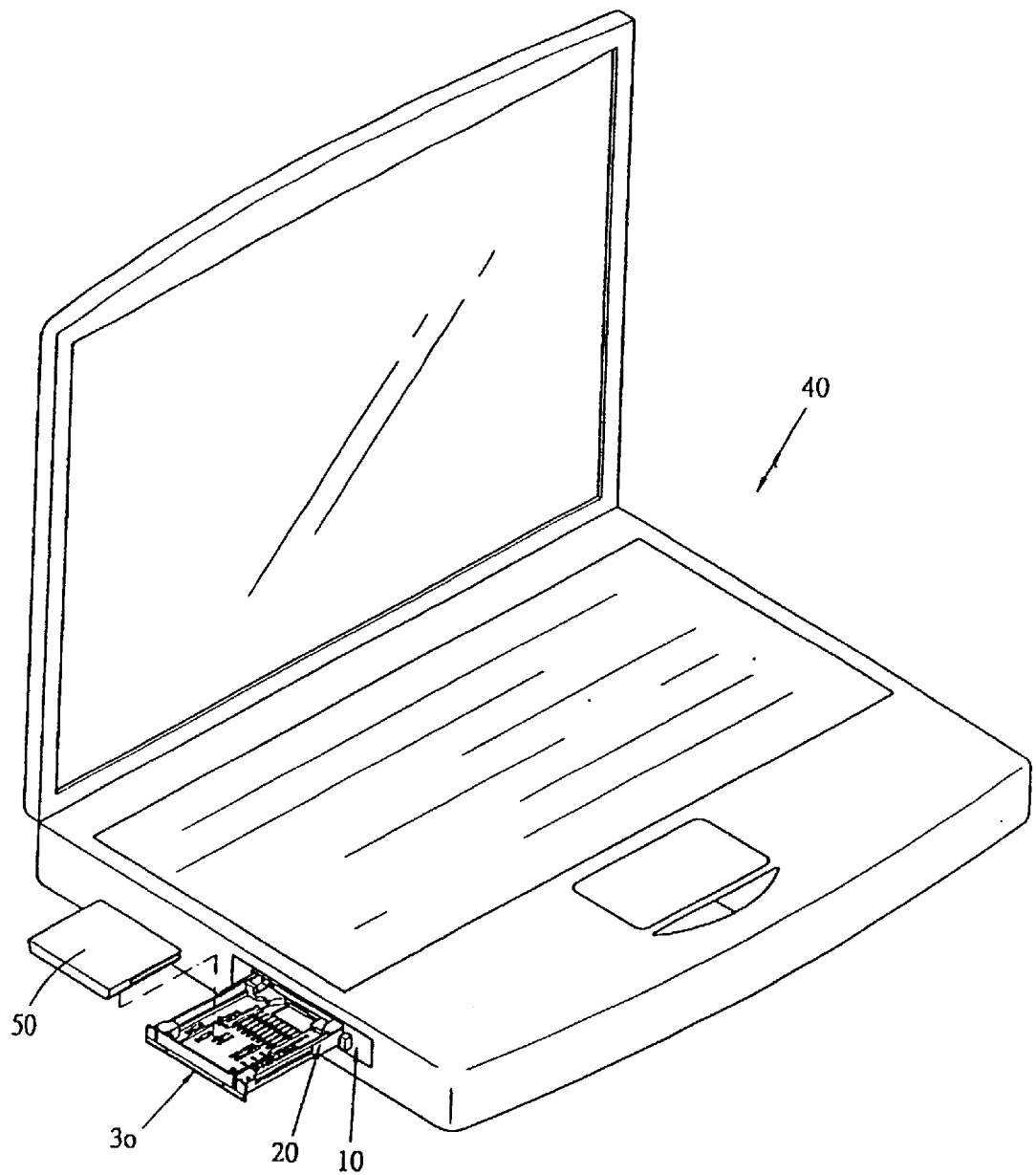
FIG. 2 is a perspective view illustrating a tray-style flash memory drive according to the present invention being embedded in a computer.
Figure 3:
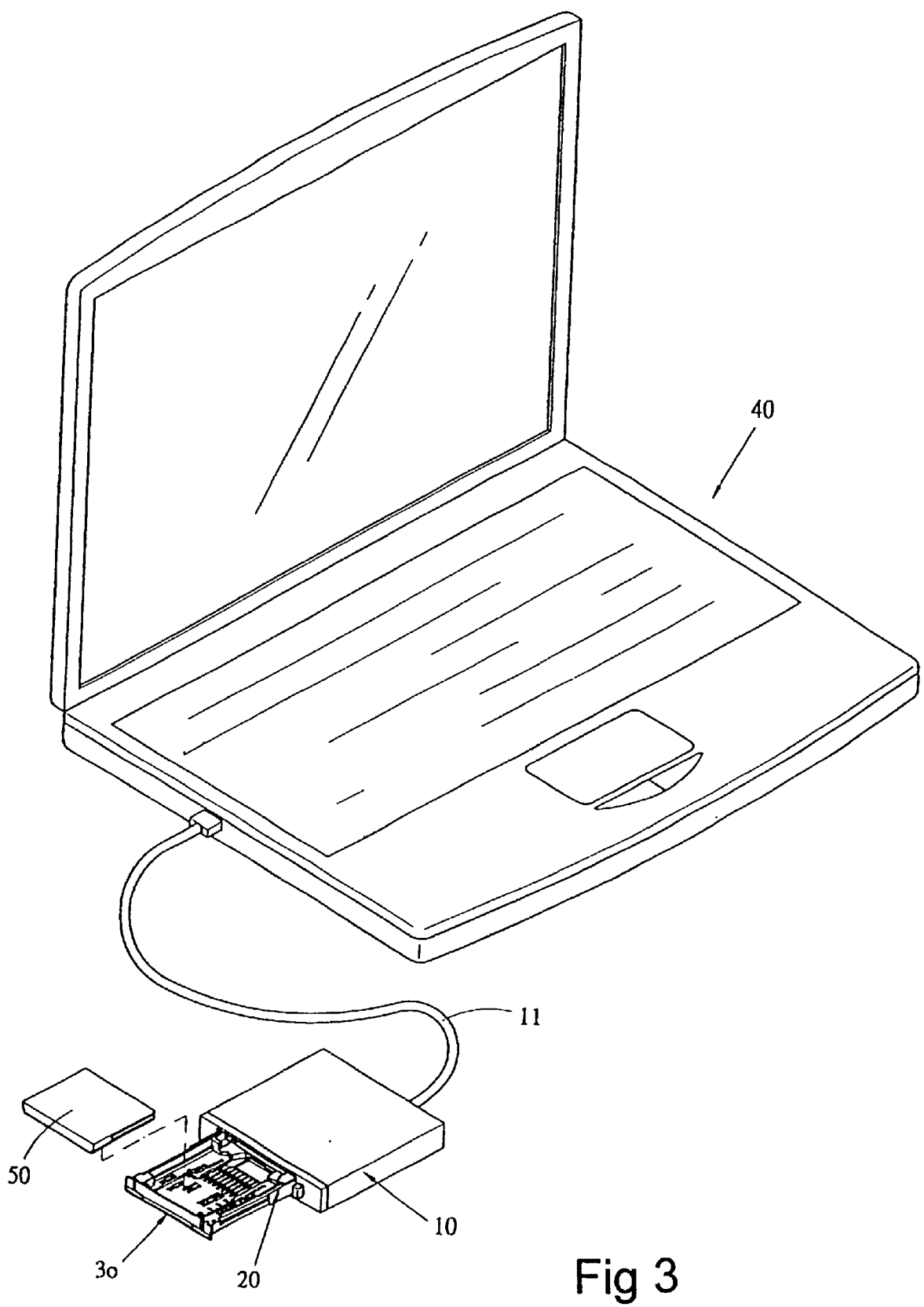
FIG. 3 is a perspective view of the tray-style flash memory drive of the present invention being externally connected to a computer.

As shown in FIG. 2 and FIG. 3, the tray-style flash memory drive of the present invention comprises a case (10), a base (20) in the case (10), and a tray (30) that can slide forward and backward on the base (20), wherein the case (10) has a signal transmission unit (11), which can be embedded in or externally connected to a computer system (40) or portable digital product. In actual implementations, the signal transmission unit (11) can employ an conventional IDE or ATAPI interface to facilitate the case (10) being embedded in the computer system (40) as shown in FIG. 2 or a USB or IEEE1394 interface to enable the case (10) being externally connected to the computer (40) shown in FIG. 3 or a portable digital product.

Figure 4:
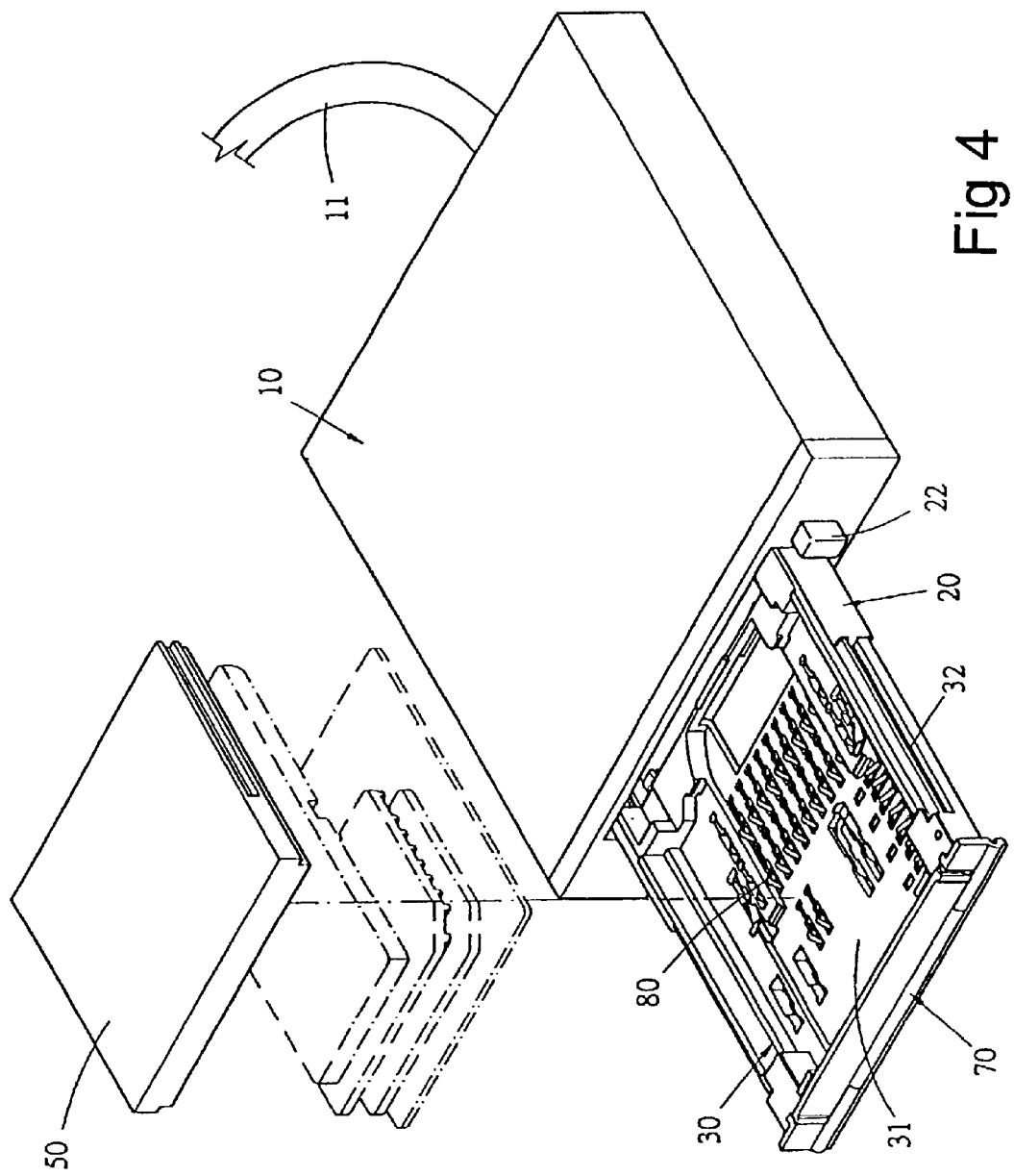
FIG. 4 is a perspective view illustrating the tray-style flash memory drive of the present invention having a tray for accommodating different memory cards.
Figure 5:
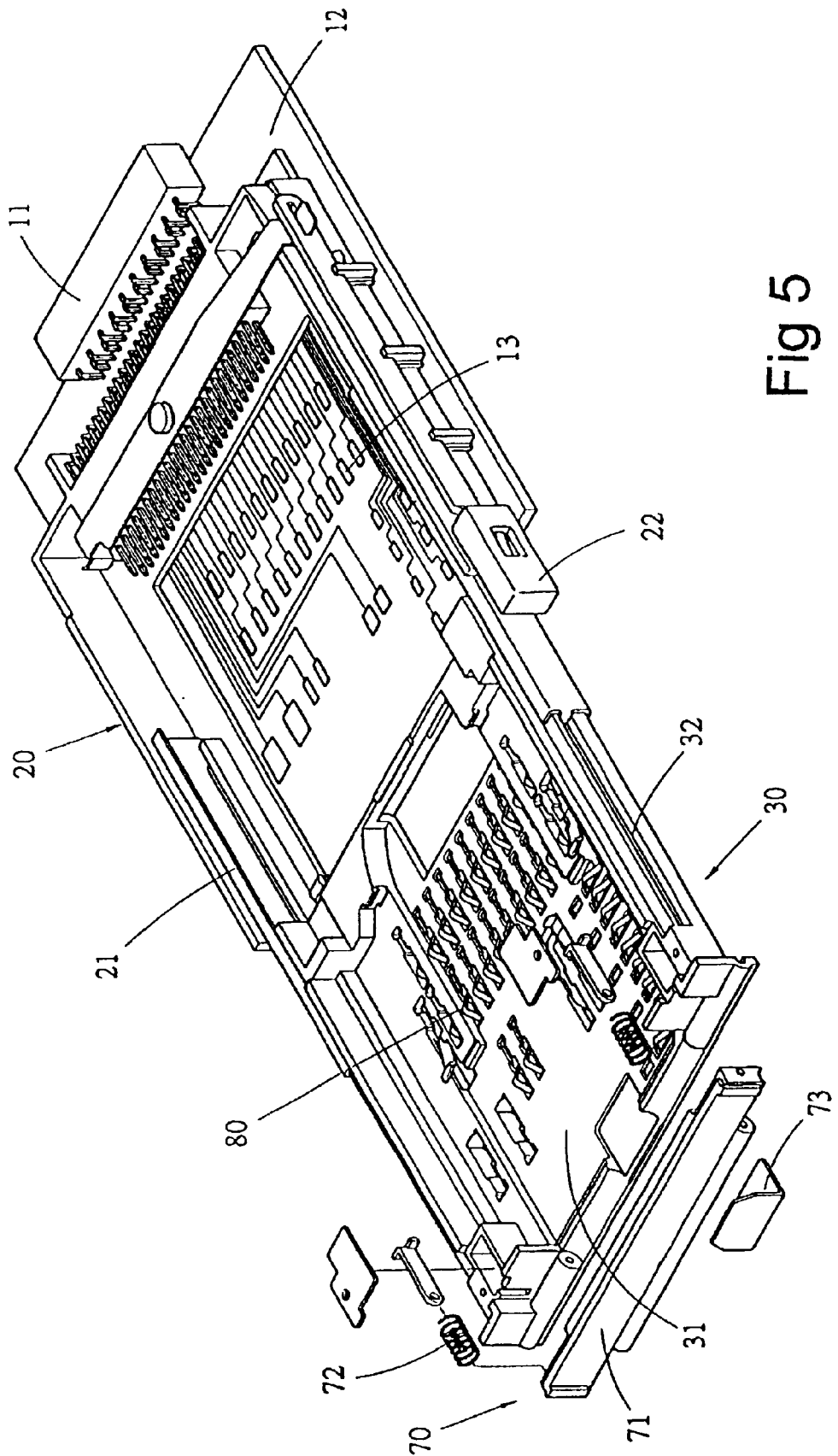
FIG. 5 is a perspective view of an embodiment of the tray-style flash memory drive according to the present invention with the lock part thereof being disassembled.

As shown in FIG. 4 and FIG. 5, the case (10) has an inner circuit board (12), and the circuit board (12) is attached with said signal transmission unit (11) and a plurality of contacts (13). The contacts (13) are disposed under the base and connected to the signal transmission unit (11). The signal transmission unit (11), which is designed to transmit signals, includes at least a chip, a connector, and signal leads coupled to the connector. FIG. 4 shows the signal leads of the signal transmission unit (11) at the back of the case (10). FIG. 5 shows the connector of the signal transmission unit (11) at the back of the circuit board (12). It is noted that the transmission unit (11) is belonged to prior art and no details will be explained further.

The base (20) is mounted on top of the circuit board (12) in the case (10), and two lateral sides of the base (20) have a slide rail (21) respectively. One of the lateral sides further has a card ejector 22. As shown in FIG. 5, the base (20) has an open bottom to expose the contacts (13) of the circuit board (12) underneath. Alternatively, as shown in FIG. 6 and FIG. 7, the base (20) has a flat bottom and a plurality of through-holes (23) are arranged at the flat bottom of the base (20) corresponding to the contacts (13) on the circuit board (12).

Figure 6:
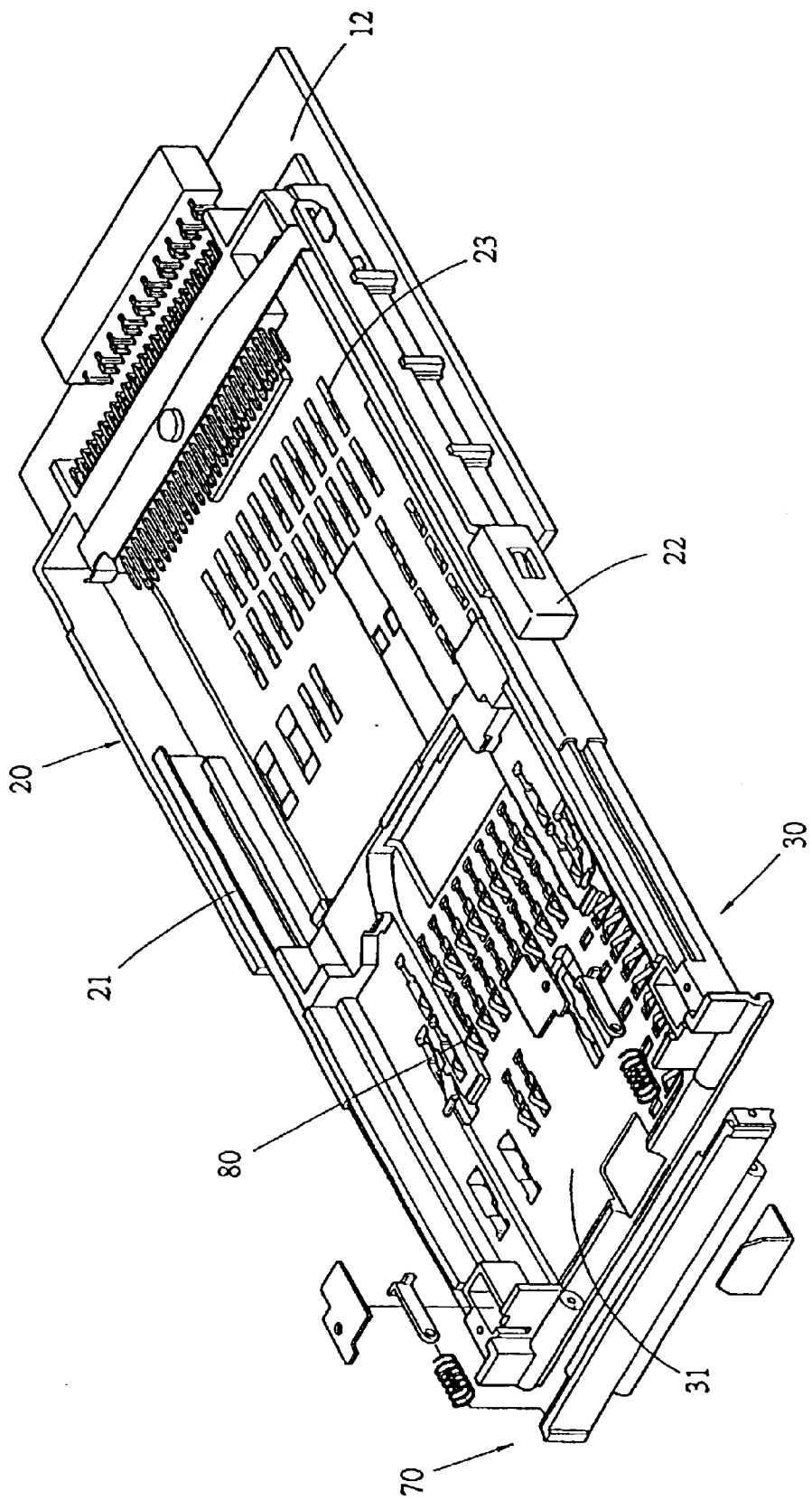
FIG. 6 is a perspective view similar to FIG. 5 illustrating another embodiment of the present invention.
Figure 7:
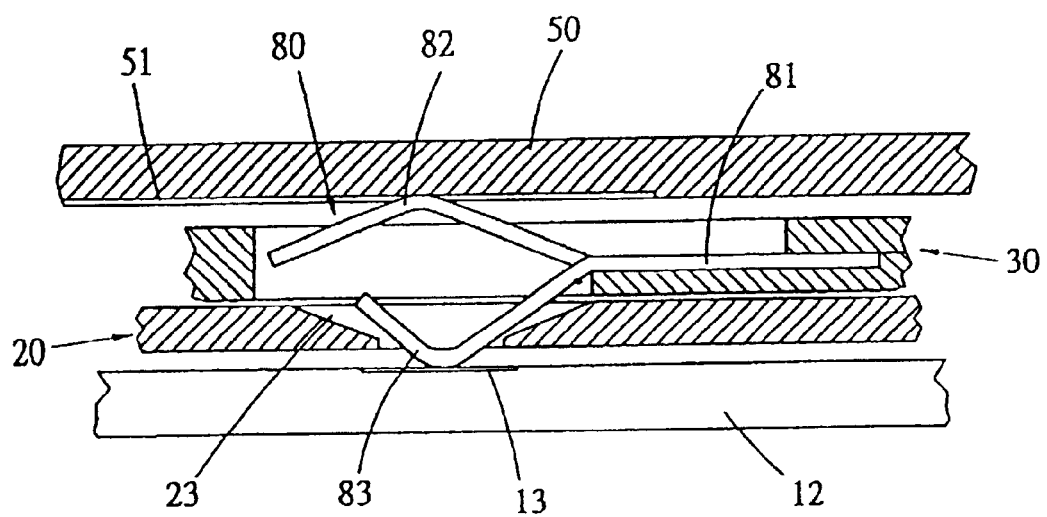
FIG. 7 is sectional view illustrating relationship between the base, tray, and the memory card shown in FIG. 6.

Please referring to FIG. 4–FIG. 7 again, said tray (30) has a containing space (31) at the center thereof to receive the memory card (50). There is a guided groove (32) at two lateral sides of said tray (30) respectively for coupling with the slide rail (21) of the base (20). In this way, the tray (30) can slide forward and backward on the base (20). There is a locking part (70) on the leading edge of the tray (30), and a plurality of terminals (80) are provided at the bottom of the tray (30) corresponding to the contacts (13) on the circuit board (12).

When the tray (30) slides out along the base (20), the memory card (50) can be placed in it, and the memory card (50) can be held with the locking part (70). At the same time, the terminals (80) on the tray (30) contact the I/O pins (51) of the memory card (50). When the tray (30) slides back to its original position, the terminals (80) on the tray (30) will contact the contacts (13) on the circuit board (12) electrically. The embodiment shown in FIG. 6 and FIG. 7 has a plurality of through-holes (23) at the bottom of the base (20) corresponding to the contacts (13) of the circuit board (12) so that when the tray (30) slides back to its original position, the terminals (80) contact the contacts (13) on the circuit board (12) through the through-holes (23).

Once the I/O pins (51) of the memory card (50) are connected to the contacts (13) via the terminals (80) on the tray (30), the data stored in the memory card (50) can be transmitted in turn to the computer (40) or a portable digital product via said signal transmission unit (11), and the memory card (50) can be accessed through the flash memory drive. Whenever the memory card (50) is to be taken out, the operator can press down the card ejector (22), and then the tray (30) can slide out of the base (20) and the memory card (50) can be taken out.

Referring to FIG. 7 again, each of terminals (80) on the tray (30) has a fixed end (81), an elastic contact end (82) and a second elastic contact end (83). The fixed end (81) is mounted on the tray (30), and the first elastic contact end (82) and the second elastic contact end (83) bend upwards and downwards, respectively.

When the memory card (50) is placed in the tray (30), the I/O pins (51) of the memory card (50) contact the first elastic contact end (82). When the tray (30) slides back, the second elastic contact end (83) contacts electrically with the contacts (13) on the circuit board (12). In this way, the I/O pins (51) of the memory card (50) are connected electrically to the contacts (13) on the circuit boards (12) via the terminals (80) to enable for data access.

Figure 8:
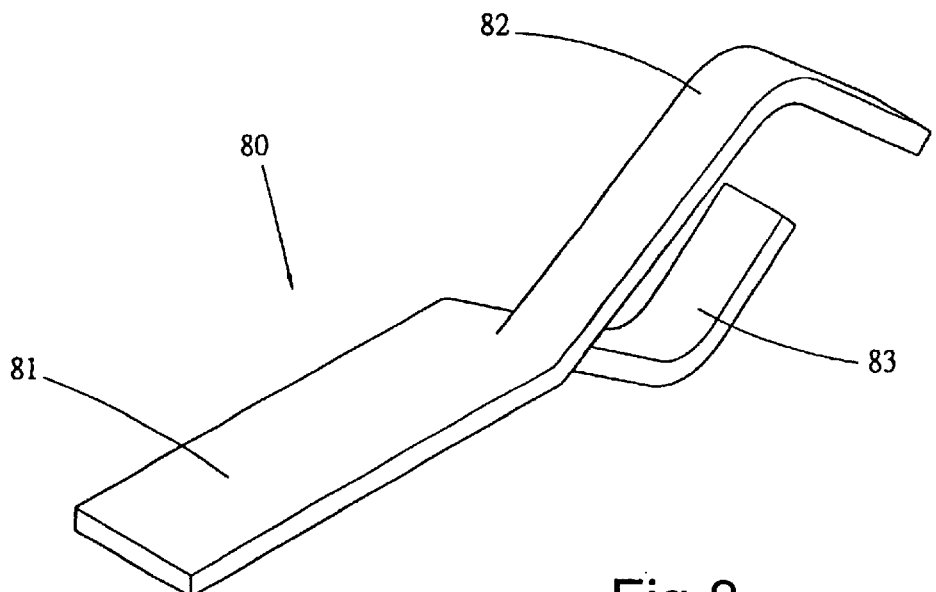
FIG. 8 and FIG. 9 are perspective views illustrating two different types of terminals being able to be attached to the trays shown in FIG. 5 and FIG. 6.
Figure 9:
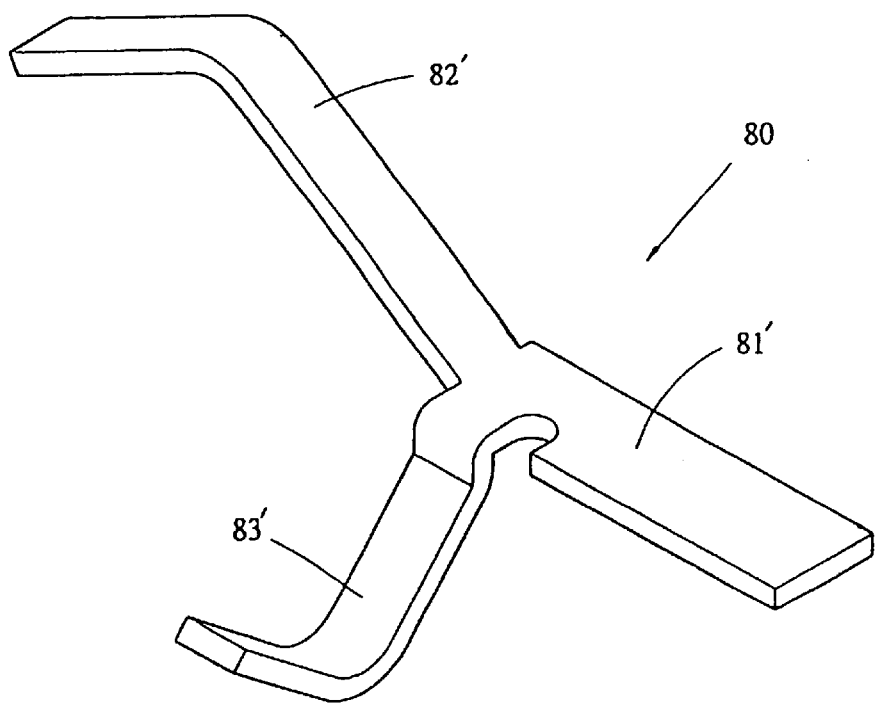

Referring to FIGS. 8 and 9, two different shapes of terminals (80, 80') are illustrated. In case of the embodiment shown in FIG. 6, the second elastic contact end (83, 83') frictionally contacts the bottom of the base (20) before the tray (30) slide back to its original position. When the tray (30) slides back to its original position, the second elastic contact end (83, 83') slides into the through-holes (23) and contact electrically the contacts (13) on the circuit board (12) Hence, the bent down direction of the second elastic contact end (83, 83') has to be the same as the sliding direction of the tray (30) so as to reduce the friction between the second elastic contact end (83, 83') and the base (20). In case of the embodiment shown in FIG. 5, the second elastic contact end (83, 83') frictionally contact the circuit board (12) when the tray (30) is in a state of sliding.

In addition, because the first elastic contact end (82, 82') and the second elastic contact end (83, 83') of the terminals (80, 80') bend upwards and downwards respectively, the direction of the first elastic contact end (82, 82') is not limited under a condition of the bend down direction of the second elastic contact end (83, 83') being the same as the sliding direction of the tray (30). Moreover, the I/O pins (51) of the memory card (50) do not frictionally contact with the terminals (80, 80') such that the direction of the memory card (50) being laid in the tray (30) is not limited, and memory cards (50) in different sizes or types can share the containing space on the tray (30). Thus, a connector can be loaded with one of the different memory cards (50) at a time to implement data exchange between the different memory cards (50) indirectly. The memory cards at least include Compact Flash Cards (Type I/II), Smart Media Cards, Multimedia Cards, Secure Digital Cards, xD Cards and Memory Stick Cards.

Further, when a memory card (50) is placed in the tray (30) and the I/O pins (51) contact the first elastic contact end (82) that bends upwards, a reaction of the first elastic contact end (82) will prop up the memory card (50). Thus, after the memory card (50) is held by said locking part (70), the I/O pins (51) of the memory card (50) can contact firmly the first elastic contact end (82).

Figure 10:
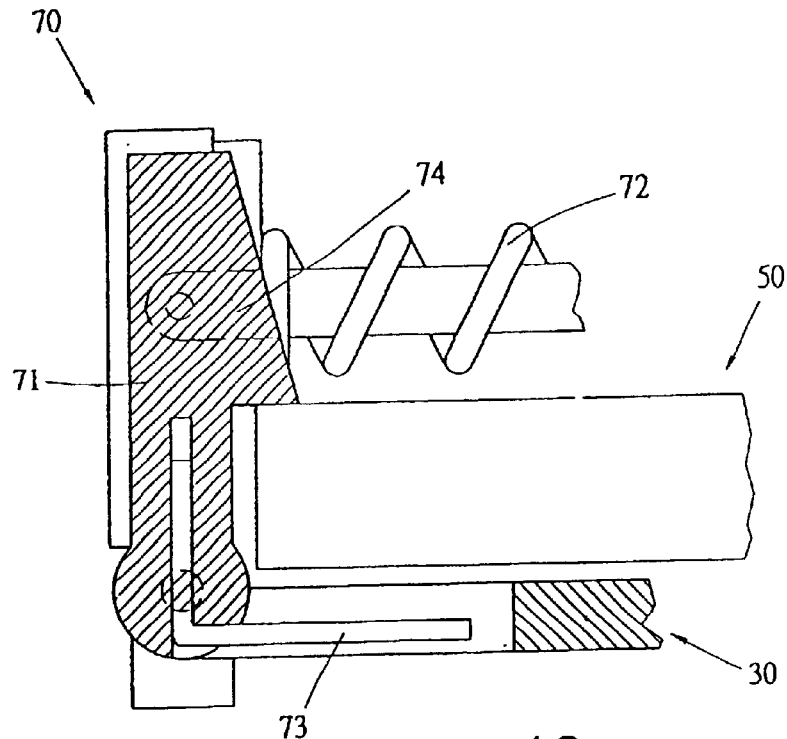
FIG. 10 and FIG. 11 are fragmentary plan views illustrating the locking part of the present invention in a state of pressing and releasing the memory card respectively.
Figure 11:
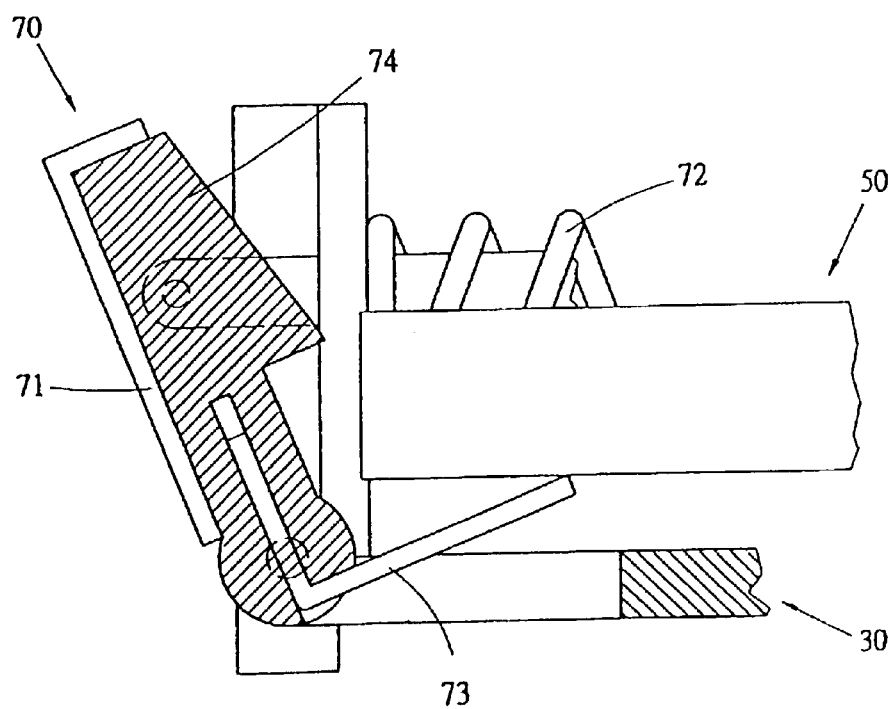

Referring to FIG. 10 and FIG. 11, the locking part (70) further comprises a blocking plate (71), at least a spring (72) and an angle shaped follower plate (73) and the blocking plate (71) is hinged to the leading edge of the tray (30) for being able to turn forwards and backwards. A hook (74) is disposed to incline downwards in the inner side of the leading edge of the tray (30). When the blocking plate (71) turns forwards, the hook will pull the spring (72), which tends to retract and pull the follower plate (73) under the blocking plate (71) to allow the follower plate (73) lifting upwards.

When the memory card (50) is placed in and pressed on the tray (30), a lateral side thereof presses against a tilt side of the hook (74) to make the blocking plate (71) turning forward a bit, and the spring (72) is stretched at the same time. As soon as the memory card (50) at the lateral side thereof passes over the hook (74), the blocking plate (71) is pulled back by the spring (72) and the memory card (50) is blocked with the hook (74) to prevent from sliding out.

When the memory card (50) is to be taken out, the operator can turn the blocking plate (71) forwards to allow the follower plate (73) lifting up, so as to prop up the memory card (50), and the operator can take out the memory card (50) easily. In addition, as shown in FIG. 7, the memory card (50) is placed in the tray (30) against the first elastic contact end (82). Hence, when the memory card (50) is released from the hook (74), it can slide out automatically under the resilient force of the first elastic contact end (82).

What is claimed is:

1. A tray-style flash memory drive, comprising
   a case;
   a circuit board, being disposed in and attached to the case, providing a plurality of contacts and a signal transmission unit, which is joined to the contacts;
   a base, being disposed on and attached to the circuit board, providing a slide rail at two opposite lateral sides thereof respectively and providing a card ejector device at one of the two lateral sides thereof; and
   a tray, having a guided groove at two opposite side thereof respectively to slidably fit with the slide rail and providing a receiving space at a central area thereof, a locking part at a front edge thereof and a plurality of terminals corresponding the contacts of the circuit board;
   whereby, when the card ejector device of the base is pressed, a memory card can be placed in the tray and located by the locking part to allow I/O pins of the memory card touching the terminals of the tray after the tray being slid outward along the slide rails of the base by the card ejector device; when the tray is pushed to slide into the base, the terminals touch the contacts of the circuit board and data can be transmitted to or from the memory card via the signal transmission unit once the tray-style flash memory drive is built in or externally connected to a computer or the like.

2. The tray-style flash memory drive as defined in claim 1, wherein the base has an open bottom.

3. The tray-style flash memory drive as defined in claim 1, the base has a flat bottom with a plurality of slots corresponding the contacts of the circuit board for exposing the contacts.

4. The tray-style flash memory drive as defined in claim 1, wherein each of the terminals has an end part being fixedly attached to the tray and another end being a first contact end and a second contact end with the first contact end being bent upward and then downward and the second contact end being bent downward and then upward.

5. The tray-style flash memory drive as defined in claim 4, wherein the second contact end extends along a direction same as the first contact end.

6. The tray-style flash memory drive as defined in claim 4, wherein the second contact end extends along a direction perpendicular to the first contact end.

7. The tray-style flash memory drive as defined in claim 1, wherein the locking part further comprises a blocking plate with a hook side, being pivotally connected to the front edge of the tray;

at least a spring, being disposed against the front edge;

an angle shaped follower plate, being attached to a lower side of the blocking plate;

whereby, when the memory card is placed in the tray, the hook side locates the memory card; when the memory card is going to be taken out, the blocking plate is turned outward by a force with the spring being biased and the follower plate lifts the memory card; and the blocking plate moves back to original position due to the restoring force of the spring as soon as the blocking plate is free from the force.

* * * * *